United States Patent
Snodgrass et al.

(10) Patent No.: US 9,574,448 B2
(45) Date of Patent: Feb. 21, 2017

(54) SPLIT CONTROL UNIT

(75) Inventors: Brett Jay Snodgrass, Byron, IL (US); Charlie Carson, Grand Rapids, MI (US); Carthel C. Baker, Oregon, IL (US); Michael P. Garry, Rockford, IL (US)

(73) Assignee: Woodward, Inc., Fort Collins, CO (US)

( * ) Notice: Subject to any disclaimer, the term of this patent is extended or adjusted under 35 U.S.C. 154(b) by 974 days.

(21) Appl. No.: 13/588,767

(22) Filed: Aug. 17, 2012

(65) Prior Publication Data

US 2013/0042920 A1 Feb. 21, 2013

Related U.S. Application Data

(60) Provisional application No. 61/525,420, filed on Aug. 19, 2011.

(51) Int. Cl.
| | |
|---|---|
| *F01D 5/14* | (2006.01) |
| *F23K 5/06* | (2006.01) |
| *F23R 3/34* | (2006.01) |
| *F02C 7/228* | (2006.01) |
| *F02C 9/34* | (2006.01) |

(Continued)

(52) U.S. Cl.
CPC ............... *F01D 5/147* (2013.01); *F01D 5/148* (2013.01); *F02C 7/228* (2013.01); *F02C 9/263* (2013.01); *F02C 9/34* (2013.01); *F23K 5/06* (2013.01); *F23R 3/34* (2013.01); *F02C 1/00* (2013.01); *F02C 9/26* (2013.01); *F02C 9/28* (2013.01); *F02G 3/00* (2013.01); *F05D 2230/51* (2013.01); *F05D 2230/80* (2013.01); *F05D 2240/304* (2013.01); *F05D 2250/90* (2013.01); *F16K 11/00* (2013.01); *F23K 2203/105* (2013.01); *F23R 2900/00004* (2013.01); *Y02T 50/673* (2013.01); *Y10T 137/0318* (2015.04); *Y10T 137/877* (2015.04)

(58) Field of Classification Search
CPC ................. F02C 9/26; F02C 9/28; F02C 1/00; F02G 3/00; F16K 11/00
USPC ......................................... 137/613, 563, 861
See application file for complete search history.

(56) References Cited

U.S. PATENT DOCUMENTS 4,263,781 A * 4/1981 Harner et al. .................. 60/243
5,321,949 A 6/1994 Napoli et al.
(Continued)

OTHER PUBLICATIONS

U.S. Appl. No. 13/588,355, filed Aug. 17, 2012, Snodgrass et al.

*Primary Examiner* — Michael R Reid
*Assistant Examiner* — Christopher Ballman
(74) *Attorney, Agent, or Firm* — Reinhart Boerner Van Deuren P.C.

(57) ABSTRACT

A split control unit in a distributed flow unit includes a flow inlet configured to receive a fuel flow, a first manifold having flow lines to supply fuel to one or more primary nozzles, and a second manifold having flow lines to supply fuel to one or more secondary nozzles. In an embodiment, the second manifold is in fluid communication with the flow inlet. A metering valve has a first port in fluid communication with the flow inlet and with the second manifold. The metering valve is configured to supply a metered fuel flow to the first manifold. A flow passage is in fluid communication with, and runs between, a flow line of the first manifold and a flow line of the second manifold to allow for a continuous cooling flow in the second manifold when all of the one or more secondary nozzles are closed.

20 Claims, 5 Drawing Sheets

(51) Int. Cl.
    *F16K 11/00*     (2006.01)
    *F02C 9/26*     (2006.01)
    *F02G 3/00*     (2006.01)
    *F02C 9/28*     (2006.01)
    *F02C 1/00*     (2006.01)

(56) References Cited

U.S. PATENT DOCUMENTS

| | | | |
|---|---|---|---|
| 5,339,636 A | | 8/1994 | Donnelly et al. |
| 5,448,882 A | | 9/1995 | Dyer et al. |
| 5,809,771 A | * | 9/1998 | Wernberg .................. 60/39.094 |
| 5,845,484 A | * | 12/1998 | Maker ........................ 60/39.281 |
| 6,675,570 B2 | * | 1/2004 | Herbison et al. .......... 60/39.281 |
| 6,813,876 B2 | * | 11/2004 | Griffiths et al. ............ 60/39.281 |
| 6,955,040 B1 | | 10/2005 | Myers, Jr. et al. |
| 7,007,476 B2 | | 3/2006 | Mains et al. |
| 7,036,302 B2 | | 5/2006 | Myers Jr. et al. |
| 7,386,981 B2 | | 6/2008 | Zielinski et al. |
| 2006/0130455 A1 | | 6/2006 | Griffiths |
| 2008/0271456 A1 | | 11/2008 | Scully et al. |
| 2009/0126802 A1 | | 5/2009 | Rawlinson |
| 2011/0023982 A1 | * | 2/2011 | Griffiths ........................ 137/511 |

* cited by examiner

SPLIT CONTROL UNIT

CROSS-REFERENCE TO RELATED PATENT APPLICATIONS

This patent application claims the benefit of U.S. Provisional Patent Application No. 61/525,420, filed Aug. 19, 2011, the entire teachings and disclosure of which are incorporated herein by reference thereto.

FIELD OF THE INVENTION

This invention generally relates to fuel flow distribution systems and to flow control systems therefor.

BACKGROUND OF THE INVENTION

Controlling the fuel flow split between two manifolds in a turbine engine fuel distribution system can be difficult due to a variety of constraints. Those constraints may include the need for cooling flow at all operating conditions, the need to have enrichment zones on the engine, and the need to have variable, controllable flow split over a range of total engine fuel flow rates.

Some conventional fuel distribution systems inventions have addressed these constraints with two complicated valves in each nozzle, configured to provide discrete flow split levels. These valves can be expensive, heavy, and difficult to control. Further, in many cases, they do not provide variable split flow capability.

Other conventional fuel distribution systems have incorporated simpler nozzle valves with known pressure-versus-flow characteristics. Some of these have incorporated a controllable orifice at the inlet of one or both of the fuel manifolds. This series of orifices then achieves a controllable fuel flow split. However, this design is sensitive to changes in the nozzle pressure versus flow characteristic, and requires a recirculation manifold to provide cooling flow.

Embodiments of the invention represent an advancement over the state of the art with respect to split flow capability in fuel distribution systems. These and other advantages of the invention, as well as additional inventive features, will be apparent from the description of the invention provided herein.

BRIEF SUMMARY OF THE INVENTION

In one aspect, embodiments of the invention provide a split control unit to provide a continuous cooling flow in a distributed flow unit. The split control unit includes a flow inlet configured to receive a fuel flow, a first manifold having flow lines to supply fuel to one or more primary nozzles, and a second manifold having flow lines to supply fuel to one or more secondary nozzles. In an embodiment, the second manifold is in fluid communication with the flow inlet. A metering valve has a first port in fluid communication with the flow inlet and with the second manifold. The metering valve is configured to supply a metered fuel flow to the first manifold. A flow passage is in fluid communication with, and runs between, a flow line of the first manifold and a flow line of the second manifolds to allow for a continuous cooling flow in the second manifold when all of the one or more secondary nozzles are closed.

In a particular embodiment, the split control unit further includes a throttling valve disposed between a second port on the metering valve and the first manifold, the throttling valve configured to maintain a relatively constant pressure drop across the first and second ports of the metering valve. In a more particular embodiment, the throttling valve has a first port in fluid communication with the second port of the metering valve, and a second port in fluid communication with the flow inlet. In yet a more particular embodiment, the metering valve and the throttling valve operate to maintain a higher pressure in the second manifold than in the first manifold, when all of the one or more secondary nozzles are closed.

In a further embodiment, the metering valve includes an enrichment port in fluid communication with the throttling valve, and with one or more non-enriched primary nozzles, wherein the one or more primary nozzles includes enriched primary nozzles to which fuel is supplied via the throttling valve. In yet another embodiment, the one or more primary nozzles includes a plurality of primary nozzles, and the one or more secondary nozzles includes an equal plurality of secondary nozzles, and further including one or more flow passages, wherein each flow passage is in fluid communication with a flow line for a primary nozzle, and is in fluid communication with a flow line for a secondary nozzle.

In a particular embodiment, the split control unit includes a valve controller configured to control the metering valve, wherein the valve controller is an electro-hydraulic servo-valve controller with two flow lines in fluid communication with two respective ports located at either end of the metering valve, and wherein the pressure differential between the two respective ports determines the position of a metering valve piston.

In another aspect, embodiments of the invention include a method of providing a continuous cooling flow in a fuel flow distribution system, the method including the steps of providing a first manifold with flow lines to supply fuel to one or more primary nozzles, and providing a second manifold with flow lines to supply fuel to one or more secondary nozzles. The method further includes constructing a flow passage between the flow lines of the first and second manifolds. The flow passage is configured to allow for a cooling flow in the second manifold when the one or more secondary nozzles are closed.

In a particular embodiment, the method includes the step of maintaining a pressure differential between the first and second manifolds when the one or more secondary nozzles are closed, wherein maintaining a pressure differential between the first and second manifolds includes maintaining a pressure differential between the first and second manifolds using a metering valve and throttling valve, the metering and throttling valves also regulating the flow to the first manifold.

In a further embodiment, the method includes the step of configuring the throttling valve to maintain a predetermined pressure drop across first and second ports of the metering valve when the one or more primary nozzles and the one or more secondary nozzles are open. In a particular embodiment, the method includes the steps of controlling the metering valve using an electro-hydraulic servo-valve, and operating the throttling valve such that its regulating port is fully open when the one or more secondary nozzles are closed. In a more particular embodiment, the method includes the step of providing a flow inlet in fluid communication with the metering port and with the second manifold.

In yet another particular embodiment, the method includes providing a first manifold with flow lines to supply fuel to one or more primary nozzles, which includes providing a first manifold with flow lines to supply fuel to one or more enriched primary nozzles, and providing a third manifold with flow lines to one or more non-enriched primary nozzles. In a more particular embodiment, the method includes the step of supplying fuel to the non-enriched primary nozzles from a flow line in fluid communication with an enrichment port of a metering valve, and supplying fuel to the enriched primary nozzles from a flow line in fluid communications with a throttling valve.

In further embodiments, in addition to metering fuel flow split, the metering control device is configured to control the pressure difference between the manifolds while passing all flow down the primary manifold. This results in the ability to control cooling flow in the individual nozzles therefore avoiding stagnant fuel in the manifold whose nozzles are closed. By providing this cooling flow, the fuel distribution system can be configured without costly extra fittings on the fuel nozzles and additional heavy and complex manifold arrangements.

In another aspect, a split flow control unit is provided. A split flow control unit according to this aspect includes a flow inlet configured to receive a total fuel flow at a first pressure. The split flow control unit also includes a metering valve with an inlet connected to the flow inlet which meters a first portion of the total fuel flow from the flow inlet to an outlet of the metering valve at a second pressure less than the first pressure. The split flow control unit also includes a throttling valve connected downstream from, and in fluid communication with, the outlet of the metering valve to sense the second pressure. The throttling valve is also connected downstream from, and in fluid communication with, the flow inlet to sense the first pressure. The throttling valve is movable in response to a pressure differential between the first and the second pressures to provide an output flow of the first portion of the total fuel flow at a third pressure, with the third pressure less than the first pressure. A first manifold is connected to the throttling valve to receive the first portion of total fuel flow at the third pressure. A second manifold is connected to the flow inlet to receive a second portion of the total fuel flow at the first pressure. A flow passage connecting the first manifold to the second manifold is provided such that a flow of fuel is permitted from the second manifold at the first pressure to the first manifold at the third pressure.

In another aspect, a split control unit is provided. A split control unit according to this aspect is capable of providing a continuous cooling flow in a distributed flow system. The split control unit includes a flow inlet configured to receive a fuel flow, and a first manifold having flow lines to supply fuel to one or more primary nozzles and one or more secondary nozzles. The split control unit further includes a jet pump including a first input port and a second input port and configured to provide flow to the first manifold. A second manifold includes flow lines that are capable of supplying fuel to the second input port of the jet pump. The split control unit also includes a metering valve with a first port in fluid communication with the flow inlet and configured to supply a metered fuel flow to the first input port of the jet pump.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Embodiments of a split control unit are disclosed herein. Typically, these embodiments work in conjunctions with nozzle valving that requires flow regulation to two or more combustion zones. However, it is contemplated that embodiments of the split control unit could be employed in systems having more than two fuel manifolds. In particular embodiments, the nozzle valving may include a bleed orifice between the two inlet fittings to allow continuous flow in both fuel manifolds regardless of operating condition.

Embodiments of the invention allow for the control of two flow circuits to a plurality of fuel nozzles, through independent primary and secondary manifolds. In particular embodiments, the system controls the flow split by metering a portion of the total flow in one of the fuel manifolds. The remainder of the total flow is passed down the other manifold. This method of fuel flow split control is insensitive to manifold pressures, thus fuel flow split accuracy is not impacted by downstream manifold and nozzle variation. Thus, the total engine fuel flow split can be accurately maintained over a wide range of operating conditions.

Figure 1:
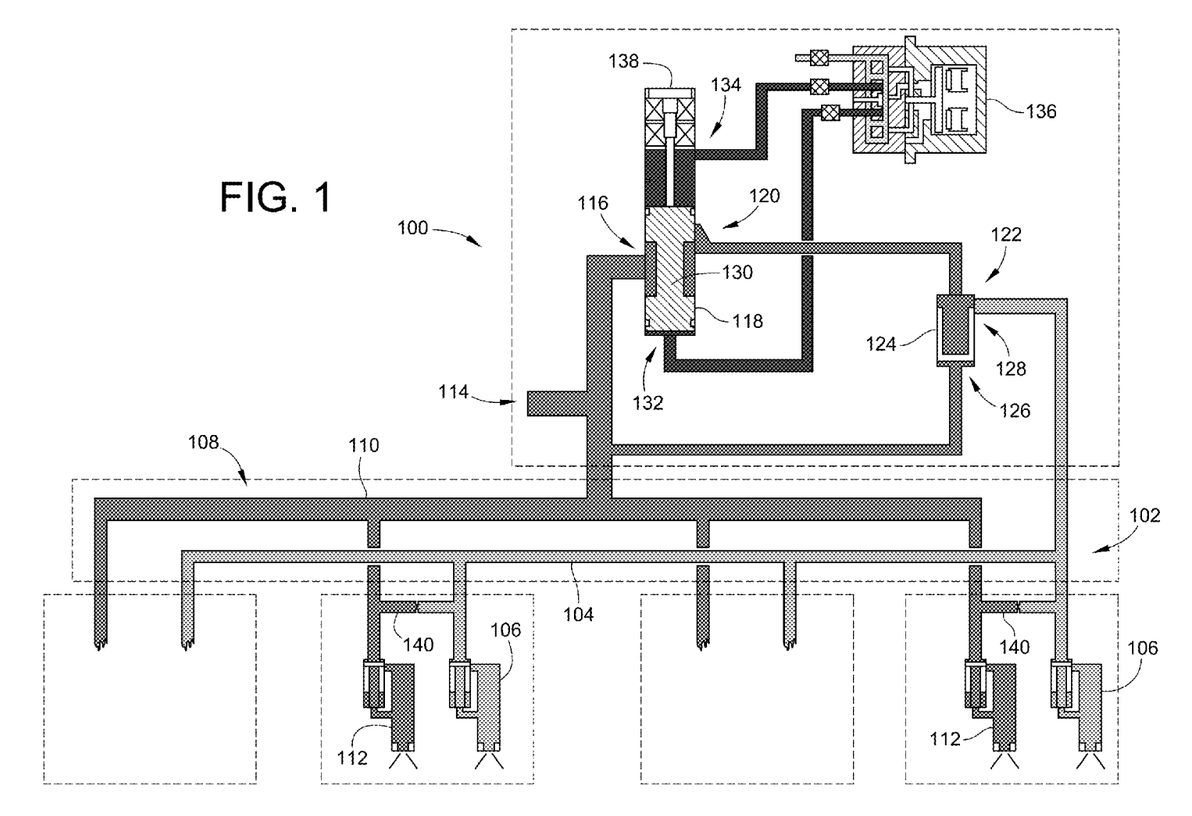
FIG. 1 is a schematic diagram of a split control unit for a fuel flow distribution system, constructed in accordance with an embodiment of the invention.

FIG. 1 is a schematic diagram of a split control unit 100 for a fuel flow distribution system, constructed in accordance with an embodiment of the invention. In the embodiment of FIG. 1, the split control unit 100 has a first fuel manifold 102, which includes flow lines 104 configured to supply fuel flow to one or more primary nozzles 106. A second fuel manifold 108 includes flow lines 110 configured to supply fuel flow to one or more secondary nozzles 112. In a typical turbine engine, such as a jet engine, primary nozzles provide the primary fuel flow to the combustion chamber of the jet engine, though the rate of that fuel flow may vary widely. Typically, secondary nozzles also provide fuel flow to the jet engine combustion chamber, but the secondary nozzles are used under certain conditions to reduce NOx emissions from the engine.

Referring still to FIG. 1, the split control unit 100 has an inlet 114, which in certain embodiments, receives a metered flow of fuel from an upstream delivery system. The inlet 114 is in fluid communication with the second fuel manifold 108, and with a first port 116 of metering valve 118. A second port 120 of metering valve 118 is in fluid communication with a first port 122 of throttling valve 124. A second port 126 of the throttling valve 124 is in fluid communication with inlet 114. Thus, the throttling valve 124 is configured to sense any pressure differential between the first and second ports 116, 120 of the metering valve 118. A third port 128 of the throttling valve 124 is in fluid communication with, and supplies fuel flow to, the first fuel manifold 102.

In a particular embodiment, the metering valve 118 has a piston 130, and two ports 132, 134 at respective ends of the of the metering valve 118 body. The two ports 132, 134 are in fluid communication with a valve controller 136. In a particular embodiment, the valve controller 136 is an electro-hydraulic servo-valve, which controls the position of piston 130 by regulating the pressure of hydraulic fluid in flow lines connected to the two ports 132, 134. In a more particular embodiment, the metering valve 118 may be connected to a linear variable differential transformer (LVDT) 138 which senses the position of the piston 130 within the metering valve 118 housing.

In operation, it is typical for the split control unit 100 to distribute total inlet 114 fuel flow into the first and second manifolds 102, 108. Flow regulation is achieved by use of the metering valve 118 and the throttling valve 124. In this operating condition, the metering valve 118 is held at a desired position via electronic engine control demand, for example. The metering valve 118 position equates to a known metering port area. The throttling valve 124 senses the pressure upstream of the metering valve first port 116, and downstream of the metering valve second port 120. Knowing valve sensing area and spring loads, the throttling valve 124 then sets a known pressure drop across the metering valve first and second ports 116, 120, thereby allowing the metered flow to the first fuel manifold 102 to be calculated. The difference between the inlet 114 flow and the first manifold 102 regulated flow is then diverted to the second manifold 108. Note that in this operating condition, both first and second fuel manifolds 102, 108 are flowing, and no additional cooling for either manifold 102, 108 is required.

Figure 2:
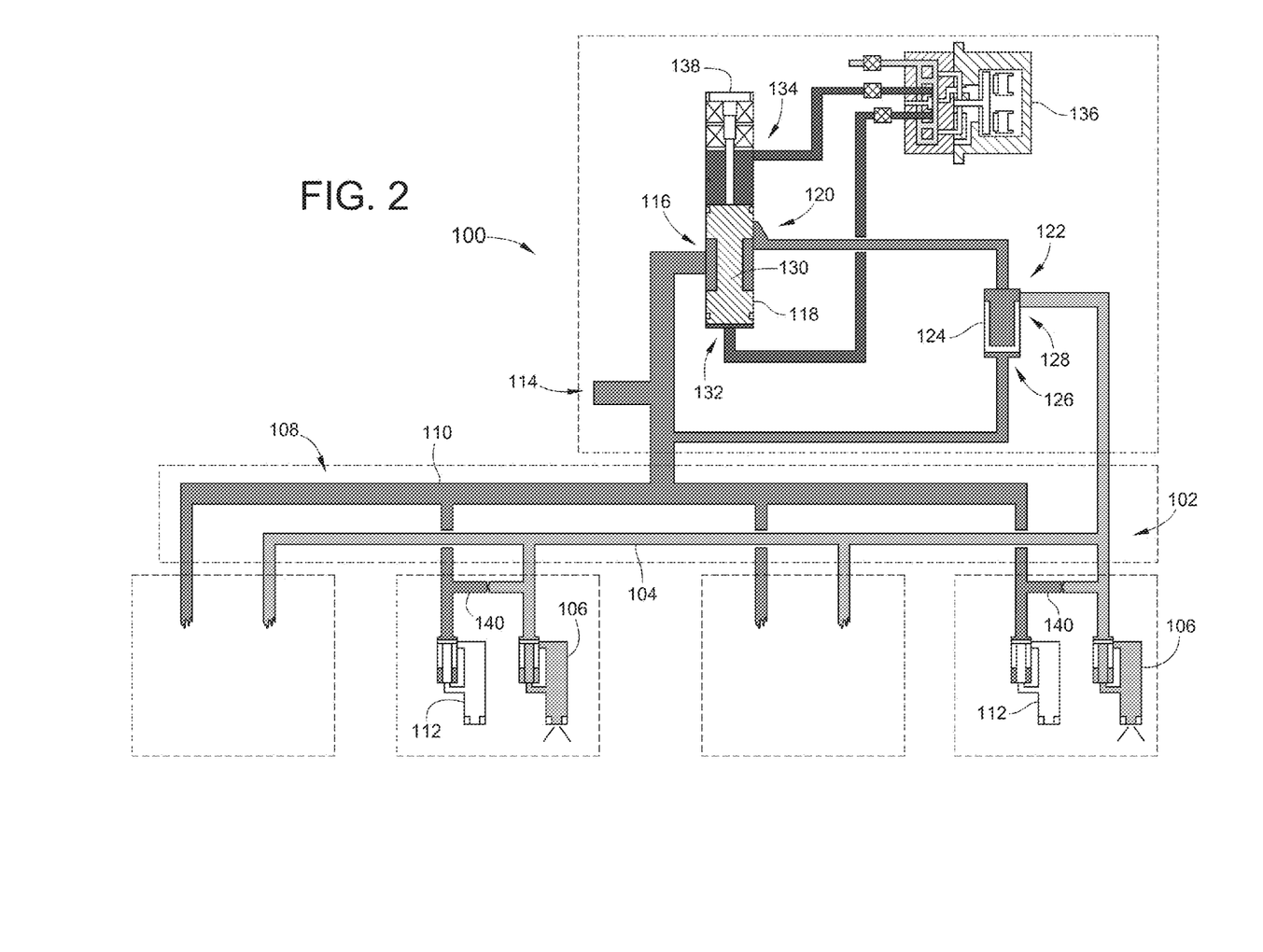
FIG. 2 is a schematic diagram of the split control unit for a fuel flow distribution system shown in FIG. 1 illustrating single manifold flow with cooling flow.

FIG. 2 is a schematic diagram of the split control unit 100 of FIG. 1 for a fuel flow distribution system illustrating single manifold flow with cooling flow. In a particular mode of operation, the split control unit 100 distributes the total inlet 114 flow to only the first manifold such that only the primary nozzles 106 supply fuel to the combustion chamber (not shown) of the turbine engine (not shown). In this operating condition, simply shutting off the second manifold 108 would result in no flow through the second fuel manifold 108, resulting in high fuel line wall temperatures that are undesirable. To avoid adding another manifold for the sole purpose of providing cooling flow for this shutoff second fuel manifold 108, embodiments of the invention include configurations of the split control unit 100 in which the metering valve 118 is positioned to provide a pressure below the throttling valve 124 regulation pressure, but greater than zero pressure.

Given this condition, the throttling valve 124 spring load responds to fully open its regulating port, or third port 128, resulting in very little pressure loss across the throttling valve 124. The primary flow in the first fuel manifold 102 has a pressure which is then slightly lower than the pressure in the non-flowing second fuel manifold 108. Installing a flow passage 140 between the flow lines 104, 110 of the first and second fuel manifolds 102, 108 before the nozzle valves 106, 112 provides a flow path for fuel in the non-flowing second fuel manifold 108 to flow to the first fuel manifold 102. In this way, the second fuel manifold 108 always has a small amount of metered flow that ports to the first fuel manifold 102. This feature provides constant cooling flow to prevent high fuel tube wall temperatures in the second fuel manifold 108.

In particular embodiments of the invention to be described below, a metering valve can be configured to provide for control of enriched and non-enriched primary flow operation, such that no separate nozzle parts are required. Enrichment can be made discrete (single level), or variable depending on implementation and differential pressure. Further, embodiments of the invention use inlet pressure on the primary circuit as reference pressure for the throttling valve in the fuel flow distribution system. By using the inlet pressure on the primary circuit as a reference, the throttling valve can maintain a drip-tight seal based on spring load up to high operating pressures.

Figure 3:
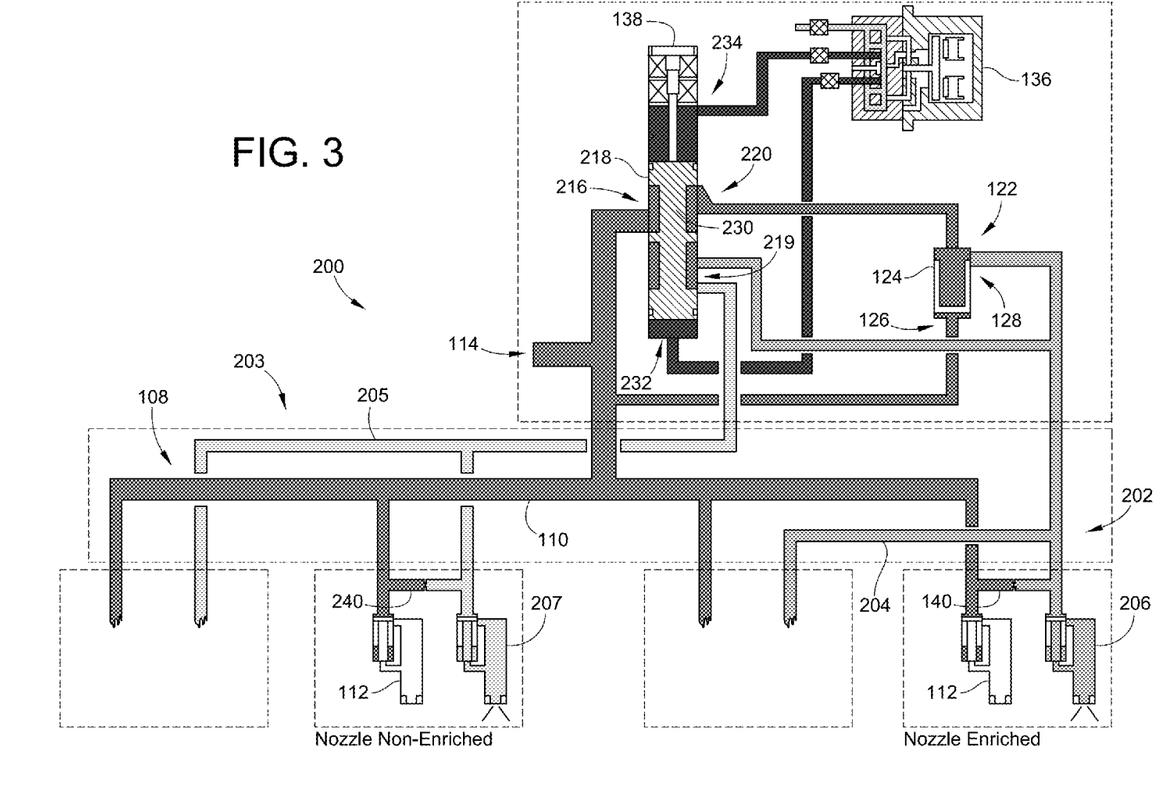
FIG. 3 is a schematic diagram of the split control unit for a fuel flow distribution system illustrating flow to enriched and non-enriched nozzles, constructed in accordance with an embodiment of the invention.

FIG. 3 is a schematic diagram of the split control unit 200 for a fuel flow distribution system illustrating flow to enriched and non-enriched nozzles, constructed in accordance with an embodiment of the invention. In the embodiment of FIG. 3, the split control unit 200 includes a first fuel manifold 202 for enriched primary nozzles 206, which includes flow lines 204 configured to supply fuel flow to one or more enriched primary nozzles 206. The split control unit 200 also includes a third fuel manifold 203 for one or more non-enriched primary nozzles 207, which includes flow lines 205 configured to supply fuel flow to the one or more non-enriched primary nozzles 207. The second fuel manifold 108 includes flow lines 110 configured to supply fuel flow to one or more secondary nozzles 112.

The split control unit 200 includes inlet 114, which in certain embodiments, receives a metered flow of fuel. The inlet 114 is in fluid communication with the second fuel manifold 108, and with a first port 216 of metering valve 218. A second port 220 of metering valve 218 is in fluid communication with the first port 122 of the throttling valve 124. The second port 126 of the throttling valve 124 is in fluid communication with inlet 114. Thus, the throttling valve 124 is configured to sense a pressure differential between the first and second ports 216, 220 of the metering valve 218. The third port 128 of the throttling valve 124 is in fluid communication with, and supplies fuel flow to, the first fuel manifold 202 for one or more enriched primary nozzles 206.

In a particular embodiment, the metering valve 218 includes an enrichment port 219, which is in fluid communication with the third port 128 of throttling valve 124, and with the third fuel manifold 203 for the one or more non-enriched primary nozzles 207. Thus, fuel is supplied to the one or more non-enriched nozzles 207 from the third port 128 of throttling valve 124 via enrichment port 219. As such, by controlling the position of piston 230, and therefore controlling the fuel flow through the enrichment port 219, it is possible to supply fuel to the one or more enriched nozzles 206 at a different flow rate than supplied to the one or more non-enriched nozzles 207.

In a particular embodiment, the metering valve 218 has a piston 230, and two ports 232, 234 at respective ends of the of the metering valve 218 body. The two ports 232, 234 are in fluid communication with the valve controller 136. As stated above, the valve controller 136 may be an electro-hydraulic servo-valve, which controls the position of piston 230 by regulating the pressure of hydraulic fluid in flow lines connected to the two ports 232, 234. In a more particular embodiment, the metering valve 218 may be connected to linear variable differential transformer (LVDT) 138 which senses the position of the piston 230 within the metering valve 218 housing.

In a particular mode of operation, the split control unit 200 distributes total inlet 114 fuel flow to first and third fuel manifolds 202, 203, while also distributing a greater portion of that fuel flow to the one or more enriched primary nozzles 206 to aid in engine starting, for example. The metering valve 218 can be used to accomplish this function by re-routing the regulated flow from the third port 128 of throttling valve 124 back through the metering valve 218 enrichment port 219, which provides a variable restriction. As stated above, two discharge ports are then provided for the first and third fuel manifolds 202, 203; one prior to the metering valve 218 restriction which supplies fuel flow to the one or more enriched primary nozzles 206, and one downstream of the metering valve 218 restriction which supplies fuel flow to the one or more non-enriched primary nozzles 207. When in this operating condition, the one or more enriched primary nozzles 206 would receive a greater fuel flow than the one or more non-enriched primary nozzles 207 due to the influence of the added metering valve restriction at enrichment port 219. Note that during this operating condition, the throttling valve 124 remains out of regulation, and the spring load responds by fully opening its regulating port, or third port 128, as in the above-described embodiment shown in FIG. 2.

As a result of the throttling valve 124 fully opening its third port 128, there is very little pressure loss across the throttling valve 124. The primary flow in the first and third fuel manifolds 202, 203 has a pressure which is then slightly lower than the pressure in the non-flowing second fuel manifold 108. Installing the flow passage 140 between the flow lines 204, 110 of the first and second fuel manifolds 202, 108 before the nozzle valves 206, 112 provides a flow path for fuel in the non-flowing second fuel manifold 108 to flow to the first fuel manifold 202. Similarly, a flow passage 240 between the flow lines 205, 110 of the second and third fuel manifolds 108, 203 before the nozzle valves 112, 207 provides a flow path for fuel in the non-flowing second fuel manifold 108 to flow to the third fuel manifold 203, albeit at a different flow rate than fuel flowing into first fuel manifold 202. This flow rate into the third fuel manifold 203 is controlled by the position of piston 230 with respect to the enrichment port 219. In this way, the second fuel manifold 108 always has a small amount of metered flow that ports to the first and third fuel manifolds 202, 203. This feature provides constant cooling flow to prevent high fuel tube wall temperatures in the second fuel manifold 108.

Figure 4:
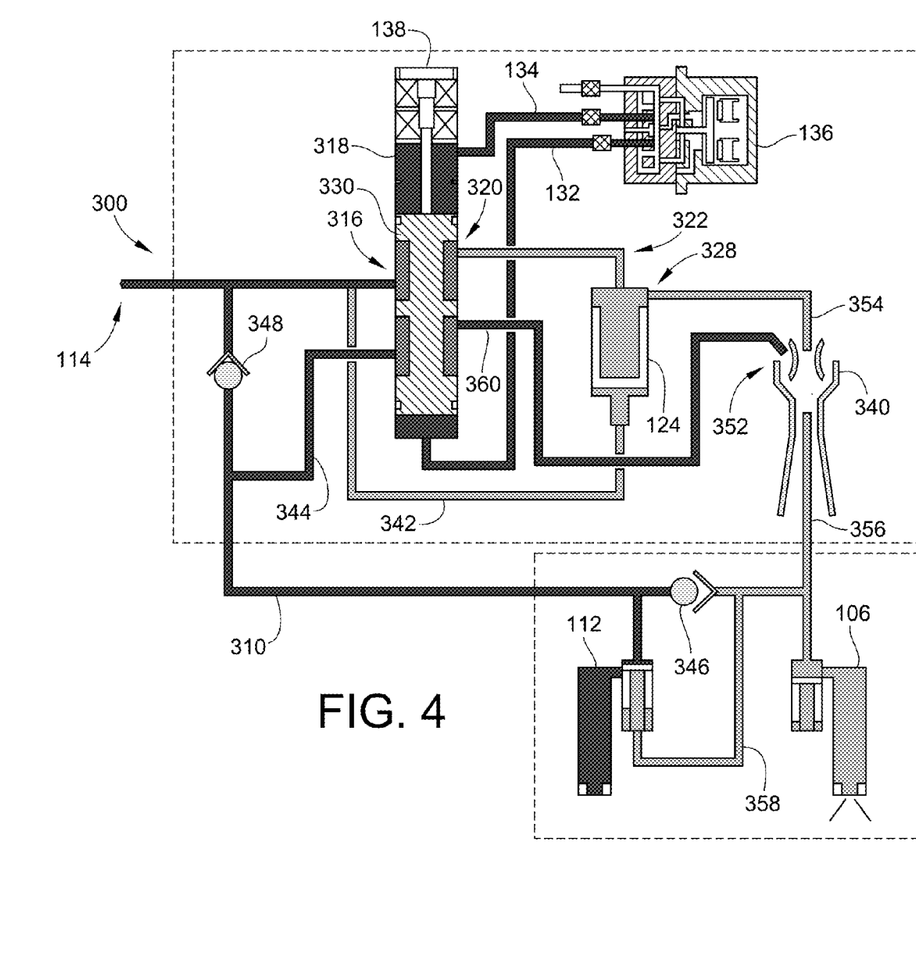
FIG. 4 is a schematic diagram of a split control unit for a fuel flow distribution system including a jet pump with cooling flow, constructed in accordance with an embodiment of the invention.

In another embodiment of the present invention, illustrated in FIG. 4, a split control unit 300 is shown, which includes a jet pump 340. Further, in the specific configuration of the split control unit 300 illustrated in FIG. 4, the jet pump 340 is operated to provide cooling flow to the primary manifold 310 during 100% flow out of primary nozzle 106.

The jet pump 340 includes two input ports and one output port. Included in the two input ports are an induced flow port 352 that provides a lower pressure sink to activate the jet pump 340 to drive cooling flow, and a motive flow port 354 that connects to the flow discharge from the throttling valve 124 to provide motive flow to the jet pump 340. The output port is a discharge port 356, which discharges into the secondary manifold 310 in order to provide flow to the primary nozzle 106.

The split control unit 300, as illustrated in FIG. 4, is configured to provide cooling flow to the secondary manifold 310. Flow enters via the inlet 114 into a first port 316 of metering valve 318. In the condition illustrated in FIG. 4, the metering valve 318 includes a piston 330 that is positioned to pass the total flow entering the first port 316 to a second port 320 of the metering valve 318. The second port 320 passes the flow to the throttling valve 124 where there is very little pressure loss due to the throttling valve 124 being biased open because of the reference pressure 342 which places a pressure equal to the pressure at the first port 316 on the throttling valve control, which opens the throttling valve 124. Therefore, motive flow or in other words total flow passes into the motive flow port 354 of the jet pump 340.

Flow is then passed through the jet pump 340 to the discharge port 356, which passes a high pressure flow from the discharge port 356 to be discharged from the primary nozzle 106. Also, a control line 358 relates that high pressure to the secondary nozzle 112 such that the nozzle is biased closed. Further, a first check valve 346 is biased open because of a pressure differential from the right side of the first check valve 346 to the left side of the first check valve 346, which is at low pressure because the total flow from inlet 114 is being passed through the metering valve 318 due to the position of the piston 330. As such, recirculation flow is passed through the check valve 346 to continue through manifold 310, thereby providing a cooling flow when the secondary nozzle 112 is not active.

Furthermore, because the total flow from the inlet 114 is being passed through the metering valve 318, a second check valve 348, which is positioned between the inlet 114 and the secondary manifold 310 containing the recirculation flow, is biased closed. Therefore, the recirculation flow is passed into a second manifold 344 to the metering valve 318, which passes this flow through a connecting passage 360 and on to the induced flow port 352 of the jet pump 340. The flow into the induced flow port 352 maintains operation of the jet pump. Therefore, as long as the piston 330 of the metering valve 318 is positioned as illustrated in FIG. 4, the jet pump 340 will be active to provide a cooling flow into the secondary manifold 310.

Figure 5:
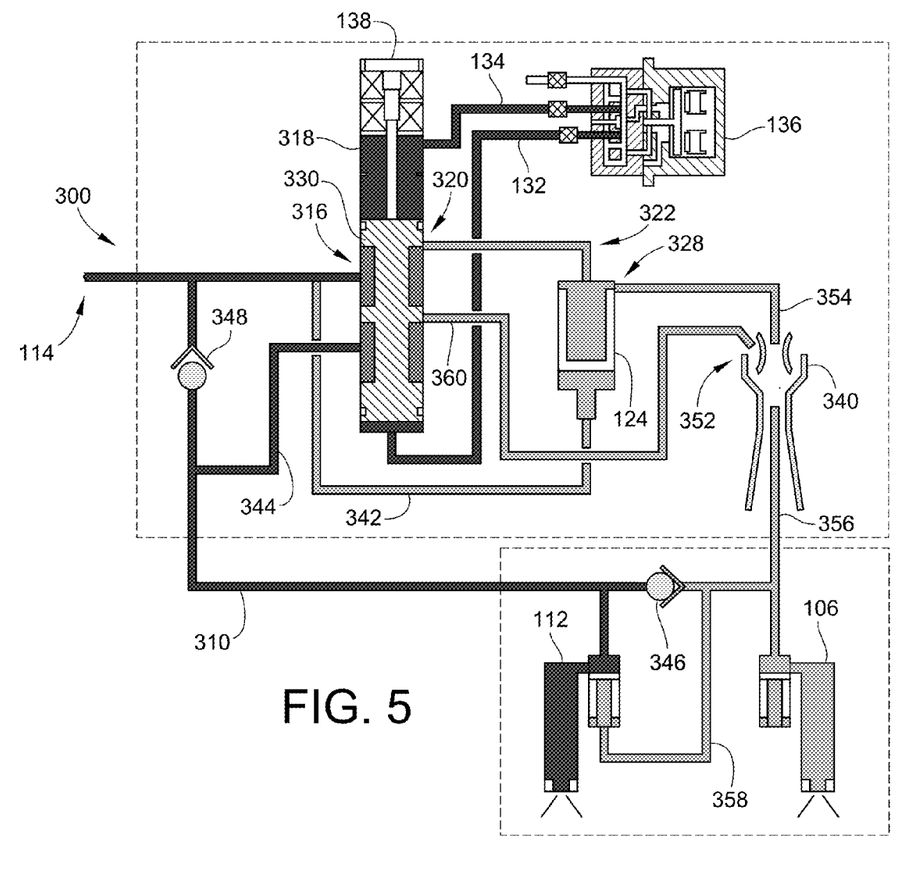
FIG. 5 is a schematic diagram of a split control unit for a fuel flow distribution system including a jet pump not configured to supply cooling flow, constructed in accordance with an embodiment of the invention.

FIG. 5 illustrates the split control unit 300 in a condition where flow is passed to both the primary valve 106 and the secondary valve 112. In this configuration, the piston 330 of the metering valve 318 is positioned to apportion a less than total flow from the inlet 114 through to the second port 320. Also, the check valve 348 is biased open because of the high pressure flow from the inlet 114 that is not passing through the metering valve 318, thereby allowing flow to enter the secondary nozzle 112 from the secondary manifold 310.

Further, the piston 330 of the metering valve 318 is biased such that is cuts off flow from the second manifold 344 to the flow passage 360. This eliminates flow entering the induced flow port 352 of the jet pump 340, which turns the jet pump 340 off. The flow that is apportioned through the metering valve 318 to the second port 320 is passed to the throttling valve 124, which is biased by the reference pressure 342 to allow only a portion of that flow through to the motive flow port 354 of the jet pump 340. Because the induced flow port 352 of the jet pump 340 is off, the flow merely passes through to the discharge port 356. The flow then exits via the primary nozzle 106. As such, in the configuration of the split control unit 300 illustrated in FIG. 5, both of the primary nozzle 106 and the secondary nozzle 112 are active, and cooling flow is not needed.

Furthermore, while not illustrated in FIGS. 4 and 5, one of ordinary skill in the art will appreciate that enrichment capability is possible with the architecture of the split control unit 300. Indeed, the enrichment capability would be similar to that of previously described architectures, as illustrated in FIGS. 1-3. Also, while the split control unit 300 illustrated in FIGS. 4 and 5 utilize check valves to separate the first and second manifold and the primary nozzle from the secondary nozzle, one of ordinary skill in the art will appreciate that the effect achieved by using the jet pump may be achieved without the check valves by using separate flow manifolds for each of the primary nozzles and the secondary nozzles, similar to the architecture illustrated in FIGS. 1-3. Additionally, the architecture in FIGS. 4 and 5 illustrate only a single set of one primary nozzle 106 and one secondary nozzle 112, but more than one set is contemplated, similar to the architectures illustrated in FIGS. 1-3. A single set was illustrated only to not overcomplicate the description.

As can be seen from the foregoing description, in embodiments of this invention, fuel flow splitting via a mass flow rate regulator is achieved, while also eliminating the need for a separate recirculation manifold. Further, the embodiments described herein accomplish this by primarily using only the existing fuel flow regulating hardware, thus making these embodiments a cost-effective solution to the problems of conventional fuel distribution systems noted above. Another advantage of certain embodiments of the invention disclosed is the incorporation of an enrichment capability into one or more of the existing fuel nozzles to allow for a greater portion of the fuel flow to only a few select nozzles.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A split control unit to provide a continuous cooling flow in a distributed flow system, the split control unit comprising:
   a flow inlet configured to receive a fuel flow;
   a first manifold having flow lines to supply fuel to one or more primary nozzles;
   a second manifold having flow lines to supply fuel to one or more secondary nozzles, the second manifold in fluid communication with the flow inlet;
   a metering valve having a first port in fluid communication with the flow inlet and with the second manifold, the metering valve configured to supply a metered fuel flow to the first manifold; and
   a flow passage in fluid communication with, and running between, a flow line of the first manifold and a flow line of the second manifolds to allow for a continuous cooling flow in the second manifold when all of the one or more secondary nozzles are closed.

2. The split control unit of claim 1, further comprising a throttling valve disposed between a second port on the metering valve and the first manifold, the throttling valve configured to maintain a relatively constant pressure drop across the first and second ports of the metering valve.

3. The split control unit of claim 2, wherein the throttling valve has a first port in fluid communication with the second port of the metering valve, and a second port in fluid communication with the flow inlet.

4. The split control unit of claim 2, wherein the metering valve includes an enrichment port in fluid communication with the throttling valve, and with a third manifold having one or more non-enriched primary nozzles.

5. The split control unit of claim 4, wherein the one or more primary nozzles of the first manifold comprise enriched primary nozzles to which fuel is supplied via the throttling valve, and wherein the enriched primary nozzles receive a greater fuel flow than the non-enriched primary nozzles.

6. The split control unit of claim 1, further comprising a valve controller configured to control the metering valve.

7. The split control unit of claim 6, wherein the valve controller comprises an electro-hydraulic servo-valve controller with two flow lines in fluid communication with two respective ports located at either end of the metering valve, and wherein the pressure differential between the two respective ports determines the position of a metering valve piston.

8. The split control unit of claim 1, wherein the one or more primary nozzles comprises a plurality of primary nozzles, and the one or more secondary nozzles comprises an equal plurality of secondary nozzles, and further comprising one or more flow passages, wherein each of the one or more flow passages is in fluid communication with a flow line for a primary nozzle, and also in fluid communication with a flow line for a secondary nozzle.

9. The split control unit of claim 1, wherein the metering valve and the throttling valve operate to maintain a higher pressure in the second manifold than in the first manifold, when all of the one or more secondary nozzles are closed.

10. A method of providing a continuous cooling flow in a fuel flow distribution system, the method comprising the steps of:

providing a first manifold with flow lines to supply fuel to one or more primary nozzles;

providing a second manifold with flow lines to supply fuel to one or more secondary nozzles; and constructing a flow passage between the flow lines of the first and second manifolds, the flow passage configured to allow for a cooling flow in the second manifold when the one or more secondary nozzles are closed.

11. The method of claim 10, further comprising the step of maintaining a pressure differential between the first and second manifolds when the one or more secondary nozzles are closed.

12. The method of claim 11, wherein maintaining a pressure differential between the first and second manifolds when the one or more secondary nozzles are closed comprises maintaining a pressure differential between the first and second manifolds using a metering valve and throttling valve, the metering and throttling valves also regulating fuel flow to the first manifold.

13. The method of claim 12, further comprising the step of configuring the throttling valve to maintain a predetermined pressure drop across first and second ports of the metering valve when the one or more primary nozzles and the one or more secondary nozzles are open.

14. The method of claim 12, further comprising the step of controlling the metering valve using an electro-hydraulic servo-valve.

15. The method of claim 12, further comprising the step of operating the throttling valve such that its regulating port is fully open when the one or more secondary nozzles are closed.

16. The method of claim 12, further comprising the step of providing a flow inlet in fluid communication with the metering port and with the second manifold.

17. The method of claim 10, wherein providing a first manifold with flow lines to supply fuel to one or more primary nozzles comprises providing a first manifold with flow lines to supply fuel to one or more enriched primary nozzles, and providing a third manifold with flow lines to one or more non-enriched primary nozzles.

18. The method of claim 17, further comprising the step of supplying fuel to the non-enriched primary nozzles from a flow line in fluid communication with an enrichment port of a metering valve.

19. The method of claim 17, further comprising the step of supplying fuel to the enriched primary nozzles from a flow line in fluid communications with a throttling valve.

20. A split flow control unit, comprising:

a flow inlet configured to receive a total fuel flow at a first pressure;

a metering valve with an inlet connected to the flow inlet wherein the metering valve meters a first portion of the total fuel flow from the flow inlet to an outlet of the metering valve at a second pressure less than the first pressure;

a throttling valve connected downstream from, and in fluid communication with, the outlet of the metering valve to sense the second pressure, the throttling valve also connected downstream from, and in fluid communication with, the flow inlet to sense the first pressure, wherein the throttling valve is movable in response to a pressure differential between the first and the second pressures to provide an output flow of the first portion of the total fuel flow at a third pressure, the third pressure less than the first pressure;

a first manifold connected to the throttling valve to receive the first portion of total fuel flow at the third pressure;

a second manifold connected to the flow inlet to receive a second portion of the total fuel flow at the first pressure; and a flow passage connecting the second manifold to the first manifold such that a flow of fuel is permitted from the second manifold at the first pressure to the first manifold at the third pressure.

\* \* \* \* \*